July 5, 1938. H. L. ECKENROTH Re. 20,778

AIR REGISTER

Original Filed Feb. 15, 1936 2 Sheets-Sheet 1

INVENTOR.
Henry Louis Eckenroth.
BY
ATTORNEYS.

July 5, 1938. H. L. ECKENROTH Re. 20,778

AIR REGISTER

Original Filed Feb. 15, 1936 2 Sheets-Sheet 2

INVENTOR.
Henry Louis Eckenroth
BY
ATTORNEYS.

Reissued July 5, 1938

Re. 20,778

UNITED STATES PATENT OFFICE 20,778

AIR REGISTER

Henry Louis Eckenroth, San Francisco, Calif., assignor of one-half to Le Roy Hanscom, Berkeley, Calif.

Original No. 2,088,643, dated August 3, 1937, Serial No. 64,109, February 15, 1936. Application for reissue September 15, 1937, Serial No. 164,040

5 Claims. (Cl. 98—106)

This invention relates to air registers.

With the advent of air conditioning and the use of air for cooling homes as well as for heating them, it has become necessary to design an air register suitable for the distribution of cold air. Since the density of air increases with a decrease in its temperature, a given volume of cold air is obviously heavier than the same volume of air at a higher temperature. For this reason it is necessary when cooling a room with cold air to distribute it to the upper strata of the room so that it will fall by gravity to the floor and in so doing cool the warmer air which it displaces and causes to rise to the upper strata. The use of air registers in a room is undesirable, for at best they are unsightly and occupy space which in many instances could be used to advantage for other purposes and for this reason the number of registers utilized in any room should be maintained at a minimum.

In general therefore it is the object of this invention to provide a convertible register which by a simple adjustment may be utilized either for the purpose of introducing hot air laterally into a room or cold air upwardly thereinto.

More specifically, one of the objects of my invention is the provision of a register having a grill hinged to its lower side which in turn is provided with a plate hinged to its upper inner side.

The invention possesses other advantageous features, some of which with the foregoing will be set forth at length in the following description where that form of the invention which has been selected for illustration in the drawings accompanying and forming a part of the present specification is outlined in full. In said drawings, two forms of the invention are shown, but it is to be understood that it is not limited to such forms, since the invention as set forth in the claims may be embodied in a plurality of forms.

Referring to the drawings.

Figure 1:
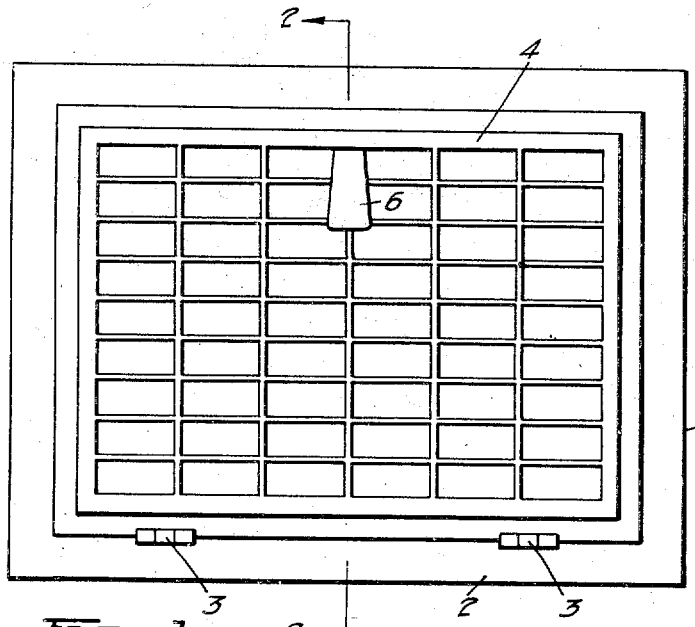
Figure 1 is a front elevation of an air register embodying the objects of my invention.
Figure 2:
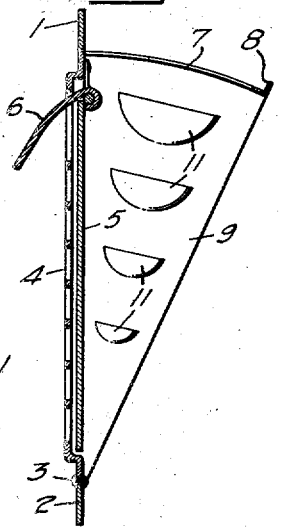
Figure 2 is a section taken on the line 2—2 of Figure 1.
Figure 3:
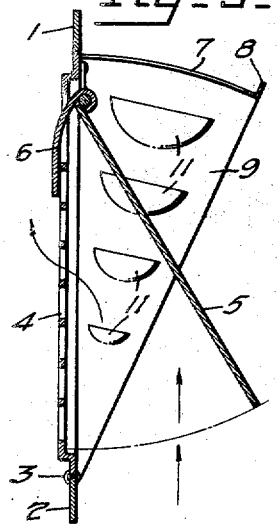
Figure 3 is a section similar to that shown in Figure 2, but with the register adjusted for the use of hot air.
Figure 4:
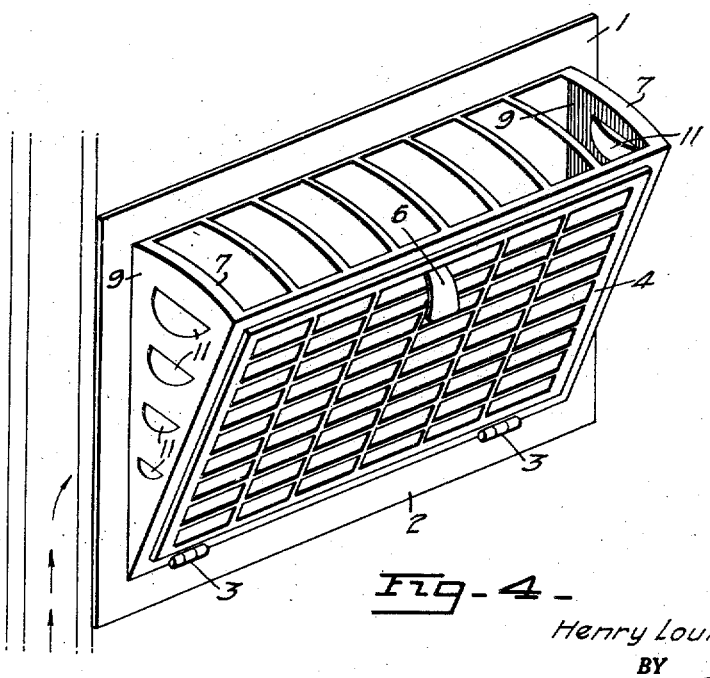
Figure 4 is a perspective view of the register shown in the above views, adjusted for the use of cold air.
Figure 5:
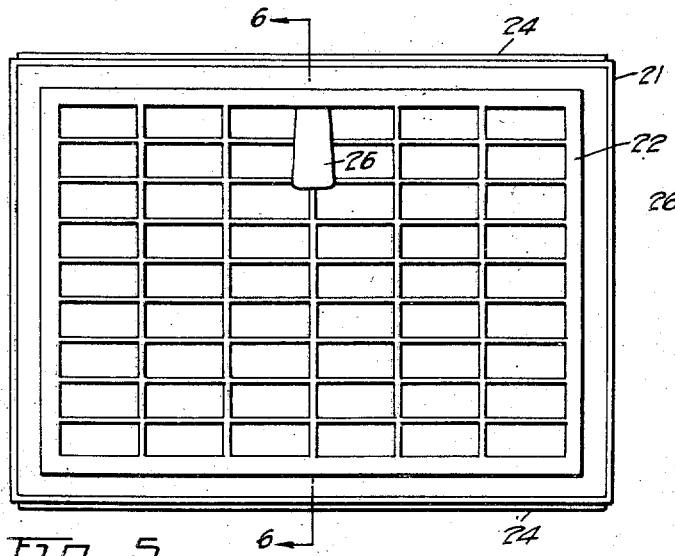
Figure 5 is a front elevation of a modified form of the register.

As best shown in Figures 1 through 4, my register comprises a frame 1 preferably rectangular in form and adapted to be mounted on a wall in the usual manner, in registration with an air conduit. Secured to the lower side 2 of the frame 1 by means of hinges 3 is a rectangular register face or grill 4 adapted in its closed position to cover the opening of the frame 1. Hingedly secured to the inner upper side of the grill 4 is a plate 5 adapted in its closed position to register with and blank off or cover the grill. Extending through the grill 4 and secured to the upper hinged edge of the plate 5 is a lever 6 by means of which the plate 5 may be pivoted about its hinges to assume either the position shown in Figure 2 or the position shown in Figure 3. The grill 4 is provided along its upper edge with an inwardly directed extension 7 which, as best shown in Figures 2, 3, and 4 is adapted to pass through the opening of the frame 1. An upwardly directed flange 8, framed along the inner edge of the extension 7, serves as a stop to limit the outer travel of the grill through the opening in the frame 1. The grill 4 is also provided with side members 9 formed with the louvers 11. As shown in Figures 2, 3, and 4, the louvers 11 are inwardly directed to permit air adjacent the register to be drawn inwardly by the upwardly directed current of air flowing through the register when the register is adjusted for cooling the room.

When it is desired to use the registers above described for the purpose of distributing cold air to the upper strata of a room, the plate 5 is closed against the grill 4 as shown in Figure 2 and then the grill 4 is swung downwardly about its hinges 3 until it assumes the position shown in Figure 4. In this position any air traveling upwardly through the conduit in communication with the register impinges against the inner face of the inclined plate 5 and is thereby directed upwardly to the ceiling of the room. By closing the grill 4 against the frame 1 and swinging the cover plate 5 inwardly as shown in Figure 3, the register may be used to deflect hot air outwardly into the room. If it is desired to close the register against the egress of either hot or cold air, the grill 4 and cover plate 5 are placed in the position shown in Figure 2.

Figure 6:
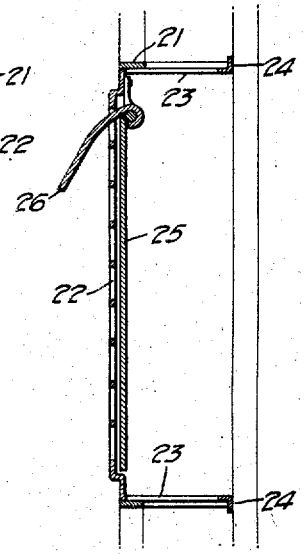
Figure 6 is a vertical section taken on the line 6—6 of Figure 5.
Figure 7:
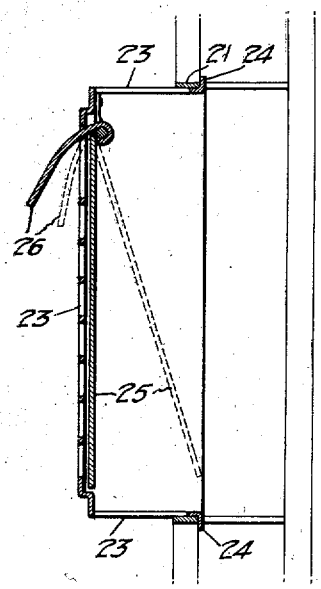
Figure 7 is a vertical section of the register shown in Figure 6 in its operative position for the use of cold air.

In Figures 5 through 8 a convertible register has been shown comprising a rectangular frame 21 adapted to be recessed in a wall. Slidably engaged within the frame 21 is a grill 22 provided with inwardly directed extensions 23, the outer ends of which are formed with flanges 24. The grill extensions 23 are provided with openings therein in the same manner as the face of the grill. The openings in the lower extension admit warm air into the register, while the openings in the upper extension permit the passage of cold air through the register, depending upon whether the device is adjusted for summer or winter use. The grill 22 with its inwardly directed extensions 23 may be pulled out of the frame 21 in the manner of a drawer until the flanges 24 engage with the inner edges of the frame 21, as shown in Figure 7. Hinged to the upper inner edge of the grill 22 is a plate 25, the upper edge of which is provided with a lever 26 extending through the grill 22 and by means of which the plate 25 may be moved about its hinges to open or close the grill 22 as desired.

In Figure 6 the register above described has been shown in its closed inoperative position wherein neither hot nor cold air may be passed therethrough.

Figure 8:
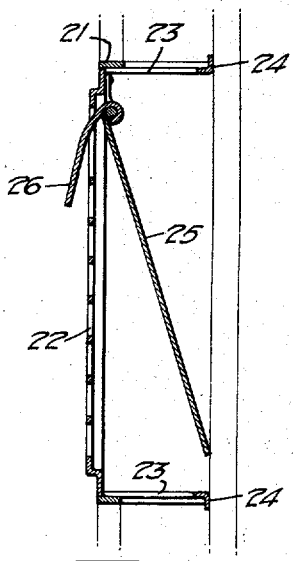
Figure 8 is a vertical section of the register shown in Figure 6 in its operative position for the use of hot air.

In Figure 7 the grill 22 is shown in its extended position with the plate 25 in dotted line in its open position. It will be seen that with the register so adjusted, cold air rising upwardly through the register will be deflected upwardly through the upper part of the register to the ceiling of the room. By leaving the cover 25 in its open position and moving the grill inwardly against the wall of the room as shown in Figure 8, hot air entering the register will be deflected by the plate 25 laterally into the room.

From the above description it will be seen that both modifications of my register above described may be converted by means of a simple adjustment for use either with hot or cold air, thereby dispensing with the necessity of individual registers for each type of service.

I claim:

1. A register comprising: a frame having an opening therein; a grill arranged in one position to lie substantially in the plane of said frame and in another position to lie with its upper edge in spaced relation to said frame; and deflecting means for outwardly deflecting air passing through said register when said grill lies substantially in the plane of said frame and for blanking off said grill when said grill lies with its upper edge in spaced relation to said frame.

2. An air register comprising: a frame; a grill hinged to the lower side of said frame and adapted to either open or cover the opening therein; and a plate hinged to the upper inner side of said grill and adapted to cover it when in its open or closed position.

3. An air register comprising: a frame adapted to slide into and out of a recessed wall; a grill secured over the outer face of said frame and a plate hinged to the upper inner side of said grill.

4. An air register for directing warm air to the lower strata of a room and for directing cold air to the upper strata thereof, comprising: a grill adapted in one position to lie substantially in the plane of a wall of said room and in another position to lie with its upper edge in spaced relation to said wall; a plate hingedly secured to the upper inner edge of said grill, said plate being free to cover said grill when the upper edge of the grill is in spaced relation to said wall; and manual control means for moving said plate about its hinge irrespective of the position of said grill.

5. An air register for directing warm air to the lower strata of a room and for directing cold air to the upper strata thereof, comprising: a frame; a grill hinged to the lower side of said frame; a plate hinged to the upper inner side of said grill, said plate being free to cover said grill when the upper edge of the grill is in spaced relation to said frame; and manual control means for moving said plate about its hinged side irrespective of the position of said grill.

HENRY LOUIS ECKENROTH.